(12) United States Patent
Kwon

(10) Patent No.: US 9,055,285 B2
(45) Date of Patent: Jun. 9, 2015

(54) POLARIZED GLASSES TYPE STEREOSCOPIC IMAGE DISPLAY DEVICE AND FABRICATION METHOD THEREOF

(71) Applicant: LG DISPLAY CO., LTD., Seoul (KR)

(72) Inventor: Dhang Kwon, Paju (KR)

(73) Assignee: LG DISPLAY CO., LTD., Seoul (KR)

( * ) Notice: Subject to any disclaimer, the term of this patent is extended or adjusted under 35 U.S.C. 154(b) by 271 days.

(21) Appl. No.: 13/691,326

(22) Filed: Nov. 30, 2012

(65) Prior Publication Data

US 2013/0141552 A1    Jun. 6, 2013

(30) Foreign Application Priority Data

Dec. 2, 2011   (KR) ........................ 10-2011-0128538

(51) Int. Cl.
    *H04N 13/04*      (2006.01)
    *G02B 27/26*      (2006.01)
    *G02F 1/1335*      (2006.01)

(52) U.S. Cl.
    CPC ........... *H04N 13/04* (2013.01); *H04N 13/0434* (2013.01); *H04N 2213/008* (2013.01); *G02B 27/26* (2013.01); *G02F 1/133512* (2013.01); *G02F 2201/40* (2013.01); *G02F 2201/503* (2013.01)

(58) Field of Classification Search
    USPC ............................................... 348/42, 51, 54
    See application file for complete search history.

(56) References Cited

U.S. PATENT DOCUMENTS

| | | | |
|---|---|---|---|
| 6,703,989 B1* | 3/2004 | Harrold et al. ................... | 345/32 |
| 7,030,424 B2 | 4/2006 | Seo et al. | |
| 8,310,647 B2 | 11/2012 | Muneyoshi et al. | |
| 2008/0136986 A1* | 6/2008 | Kim et al. ........................ | 349/40 |
| 2010/0165226 A1* | 7/2010 | Lee et al. ......................... | 349/40 |
| 2011/0122239 A1* | 5/2011 | Baik et al. ........................ | 348/58 |
| 2012/0008054 A1 | 1/2012 | Kwon et al. | |

FOREIGN PATENT DOCUMENTS

| | | |
|---|---|---|
| CN | 1680859 A | 10/2005 |
| CN | 101158792 A | 4/2008 |
| JP | 2011-158574 A | 8/2011 |
| JP | 2011-227381 A | 11/2011 |
| KR | 10-2010-0104266 A | 9/2010 |

\* cited by examiner

*Primary Examiner* — Thai Tran
*Assistant Examiner* — Jose Mesa
(74) *Attorney, Agent, or Firm* — Birch, Stewart, Kolasch & Birch, LLP

(57) ABSTRACT

According to a polarized glasses type stereoscopic image display device and a fabrication method thereof in accordance with the present invention, a light blocking pattern may be formed on a rear surface of the color filter substrate to enhance vertical viewing angle and aperture ratio. Moreover a light blocking pattern may be formed of a metal having a large hardness instead of resin BM and a step height from the rear surface ITO may be removed to prevent a scratch due to an abrasive belt.

20 Claims, 11 Drawing Sheets

POLARIZED GLASSES TYPE STEREOSCOPIC IMAGE DISPLAY DEVICE AND FABRICATION METHOD THEREOF

CROSS-REFERENCE TO RELATED APPLICATIONS

This application claims the benefit of Korean Patent Application No. 10-2011-0128538, filed on Dec. 2, 2011, which is hereby incorporated by reference for all purposes as if fully set forth herein.

BACKGROUND OF THE INVENTION

1. Field of the Invention

The present invention relates to a polarized glasses type stereoscopic image display device and a fabrication method thereof, and more particularly, to a polarized glasses type stereoscopic image display device and a fabrication method thereof capable of viewing a stereoscopic image using polarized glasses.

2. Description of the Related Art

Three-dimensional (3D) display may be briefly defined as "all types of systems for artificially generating a 3D screen."

Here, a system may include software technologies that can be seen as three-dimensional images and hardware for actually implementing contents made by the software technologies. As described above, the system includes a software region because contents configured with a particular software scheme are separately required for each stereoscopic implementation process in case of 3D display hardware.

Furthermore, virtual 3D display may be defined as all types of systems for allowing a user to virtually feel depth in the planar display hardware using binocular disparity due to our eyes being separated from each other by about 65 mm in the horizontal direction among various factors for allowing a person to feel a three-dimensional effect. In other words, our eyes view slightly different images (strictly speaking, left and right spatial information being slightly divided) even when viewing the same object due to binocular disparity, and if those two images are transmitted to the brain through the retina, then the brain fuses two images together in a correct manner to allow us to feel depth. Using this phenomenon, a virtual three-dimensional display device implements virtual depth through a design of displaying the left and right two images at the same time on a two-dimensional display device and sending them to each eye.

In order to display two channel images on a screen in the virtual 3D display hardware device, for example, each channel is outputted by changing each row in one direction (horizontal or vertical) on a screen. In this manner, when two channel images are outputted at the same time on a display device, the right eye image enters into the right eye and the left eye image enters into the left eye as they are in case of a no-glasses type from the viewpoint of hardware structure. Furthermore, in case of a glasses wearing type, it is used a method of hiding the right eye image not to be seen by the left eye and hiding the left eye image not to be seen by the right eye, respectively, through specific glasses suitable to each type.

The method of displaying such a stereoscopic image can be largely classified into a scheme of wearing glasses and a scheme of not wearing glasses, which is referred to as a no-glasses type.

The glasses wearing type may include an anaglyph type in which blue and red color glasses are used for the left and right side, respectively, a polarized glasses type, i.e., patterned retarder type, in which polarized glasses with different left and right directions are used, and a liquid crystal shutter type in which a liquid crystal shutter for periodically repeating time-sliced screens and synchronizing the period is provided, and the like. Of them, the polarized glasses type has an advantage of implementing a three-dimensional image from two 2D images.

FIG. 1 is an exemplary view schematically illustrating the structure of a related art polarized glasses type stereoscopic image display device.

Furthermore, FIG. 2 is a cross-sectional view schematically illustrating the structure of a related art polarized glasses type stereoscopic image display device.

Referring to FIGS. 1 and 2, the polarized glasses type is a scheme of using a polarization phenomenon in which a patterned retarder 20 is disposed on a front surface of the display panel 10 to spatially divide the left and right eye images, namely, the left eye image (L image (L)) and the right eye image (R image (R)).

The patterned retarder 20 of the polarized glasses type stereoscopic image display device refers to a film formed with a predetermined pattern based on the location, thereby allowing the L, R images (L, R) to implement a polarization state in perpendicular directions to each other.

For example, the patterned retarder 20 may include a glass-made substrate 23, and though not shown in detail in the drawing, an alignment layer and a birefringent layer may be formed thereon. The alignment layer and birefringent layer has a regular pattern of the first region 21 and a regular pattern of the second region 22. The first region 21 and second region 22 are formed with alternating strips to correspond to the image lines of the display panel 10, and each region 21, 22 has the same alignment direction.

When the display panel 10 is configured with a liquid crystal display, a polarizing plate 11 having a light absorbing axis in the horizontal direction is disposed, for example, between the display panel 10 and the patterned retarder 20.

At this time, the display panel 10 may be configured with two glass substrates 5, 15, and a liquid crystal layer formed between them. A thin-film transistors are formed on the lower glass substrate 15, that is to say TFT array substrate. A color filter array is formed on the upper glass substrate 5, that is to say color filter substrate and the color filter array may include a black matrix 6 and a color filter 7, and the like.

The scheme of arranging the L, R images (L, R) for each line is currently widely used. As illustrated in the drawing, the L image (L) is disposed in the odd line, and the R image (R) is disposed in the even line in the vertical direction. In this manner, when the L, R images (L, R) are displayed on the display panel 10, the user wears stereoscopic image viewing glasses 30 to view the L, R images (L, R) in a separate manner, thereby enjoying 3D images.

In the polarized glasses type, the L image (L) and R image (R) are located immediately adjacent to each other and thus the L image (L) and R image (R) cannot be correctly divided by the left and right eye lenses, thereby providing crosstalk in which the R image (R) enters into the left eye and the L image (L) enters into the right eye or vertically limited viewing angle.

Due to this, in the related art, it has been enhanced by increasing a width of the black matrix 6 on the upper glass substrate 5, but in this case, a problem of reducing an aperture ratio in proportion to the increased width of the black matrix 6 is created.

SUMMARY OF THE INVENTION

An object of the present invention is to provide a polarized glasses type stereoscopic image display device and a fabrication method thereof in which a light blocking pattern is formed on a rear surface of the color filter substrate, thereby enhancing vertical viewing angle and aperture ratio.

Another object of the present invention is to provide a polarized glasses type stereoscopic image display device and a fabrication method thereof in which a light blocking pattern is formed of a metal having a large hardness, as well as a step height from the rear surface ITO is removed, thereby preventing a scratch due to an abrasive belt.

Other objects and features of the present invention will be described in the configuration of the invention and claims which follow hereinbelow.

In order to accomplish the foregoing object, there is provided a polarized glasses type stereoscopic image display device, and the device may include a display panel in which a color filter substrate and an array substrate are bonded together to display the left and right eye images on pixels for each line; a plurality of light blocking pattern made of a metal having a value of 5 to 10 based on Mohs hardness, and formed in a stripe shape on a rear surface of the color filter substrate between vertically adjacent pixels; a electrostatic discharging layer covering the plurality of light blocking pattern and reducing a step height of the plurality of light blocking pattern; a polarizing plate adhered on the plurality of electrostatic discharging pattern; and a patterned retarder adhered on the polarizing plate to spatially divide the left and right eye images displayed through the display panel.

A polarized glasses type stereoscopic image display device according to another embodiment of the present invention may include a display panel in which a color filter substrate and an array substrate are bonded together to display the left and right eye images on pixels for each line; a plurality of light blocking pattern made of a metal having a value of 5 to 10 based on Mohs hardness, and formed in a stripe shape on a rear surface of the color filter substrate between vertically adjacent pixels; a plurality of electrostatic discharging pattern formed between the light blocking patterns; a polarizing plate adhered on the plurality of electrostatic discharging pattern; and a patterned retarder adhered on the polarizing plate to spatially divide the left and right eye images displayed through the display panel.

Here, the device may be characterized in that the light blocking pattern is formed of a metal selected from a group including Cr, Fe, Co, Ta, Mo, MoTi, and the like.

The device may be characterized in that the light blocking pattern has a thickness of 300-1000 Å.

Here, the device may be characterized in that the electrostatic discharging pattern has the same thickness as the light blocking pattern.

The electrostatic discharging pattern and electrostatic discharging layer are made of transparent conductive electrode, i.e., ITO,IZO.

Furthermore, a method of fabricating a polarized glasses type stereoscopic image display device according to an embodiment of the present invention may include forming a plurality of light blocking pattern in a stripe shape on a rear surface of the color filter substrate on which a color filter layer is formed; forming a electrostatic discharging layer covering the plurality of light blocking pattern and reducing a step height of the plurality of light blocking pattern; bonding the color filter substrate formed with the plurality of light blocking pattern to an array substrate to form a display panel for displaying the left and right eye images on pixels for each line; adhering a polarizing plate on the electrostatic discharging layer of the color filter substrate in the display panel; and adhering a patterned retarder for spatially dividing the left and right eye images displayed through the display panel on the polarizing plate.

A method of fabricating a polarized glasses type stereoscopic image display device according to another embodiment of the present invention may include forming a plurality of light blocking pattern in a stripe shape on a rear surface of the color filter substrate on which a color filter layer is formed; forming a plurality of electrostatic discharging pattern in a stripe shape between the light blocking patterns; bonding the color filter substrate formed with the plurality of light blocking pattern to an array substrate to form a display panel for displaying the left and right eye images on pixels for each line; adhering a polarizing plate on the electrostatic discharging layer of the color filter substrate in the display panel; and adhering a patterned retarder for spatially dividing the left and right eye images displayed through the display panel on the polarizing plate.

Here, the method may be characterized in that the light blocking pattern is formed in a stripe shape on a rear surface of the color filter substrate between vertically adjacent pixels.

Here, the method may be characterized in that the forming a plurality of light blocking pattern further comprising; forming a first metal layer with a metal on a rear surface of the color filter substrate on which a color filter is formed; forming a photoresist pattern on the first metal layer; selectively etching the first metal layer using the photoresist pattern as a mask to form a light blocking pattern.

Here, the method may be characterized in that the forming a plurality of electrostatic discharging patterns in a stripe shape between the light blocking patterns further comprising; forming a second metal layer made of ITO over an entire rear surface of the color filter substrate formed with the light blocking pattern in a state the photoresist pattern is remained; selectively removing the second metal layer through a lift-off method to form an electrostatic discharging pattern in a stripe shape between the light blocking patterns.

Here, the method may be characterized in that the light blocking pattern is formed of a metal having a value of 5 to 10 based on Mohs hardness selected from a group including Cr, Fe, Co, Ta, Mo, MoTi, and the like.

Here, the method may be characterized in that the first metal layer is formed with a thickness of 300-1000 Å.

Here, the method may be characterized in that the second metal layer is formed with the same thickness as the first metal layer.

Here, the method may be characterized in that the photoresist pattern and the second metal layer remained on the photoresist pattern are selectively removed to form a rear surface ITO made of the second metal layer in a stripe shape between the light blocking patterns.

As described above, according to a polarized glasses type stereoscopic image display device and a fabrication method thereof in accordance with the present invention, a light blocking pattern may be formed on a rear surface of the color filter substrate, thereby enhancing vertical viewing angle and aperture ratio. As a result, it may provide an effect of enhancing the quality of 3D images in the stereoscopic image display device.

Furthermore, according to a polarized glasses type stereoscopic image display device and a fabrication method thereof in accordance with the present invention, a light blocking pattern is formed of a metal having a large hardness instead of resin BM, as well as a step height from the light blocking pattern is reduced, thereby preventing a scratch due to an abrasive belt. As a result, it may be possible to enhance process yield as well as facilitate the rework of a polarizing plate since the light blocking pattern is formed of a metal, thereby providing an effect of reducing fabrication cost.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a polarized glasses type stereoscopic image display device and a method of fabricating the same will be described in detail with reference to the accompanying drawings.

Figure 1:
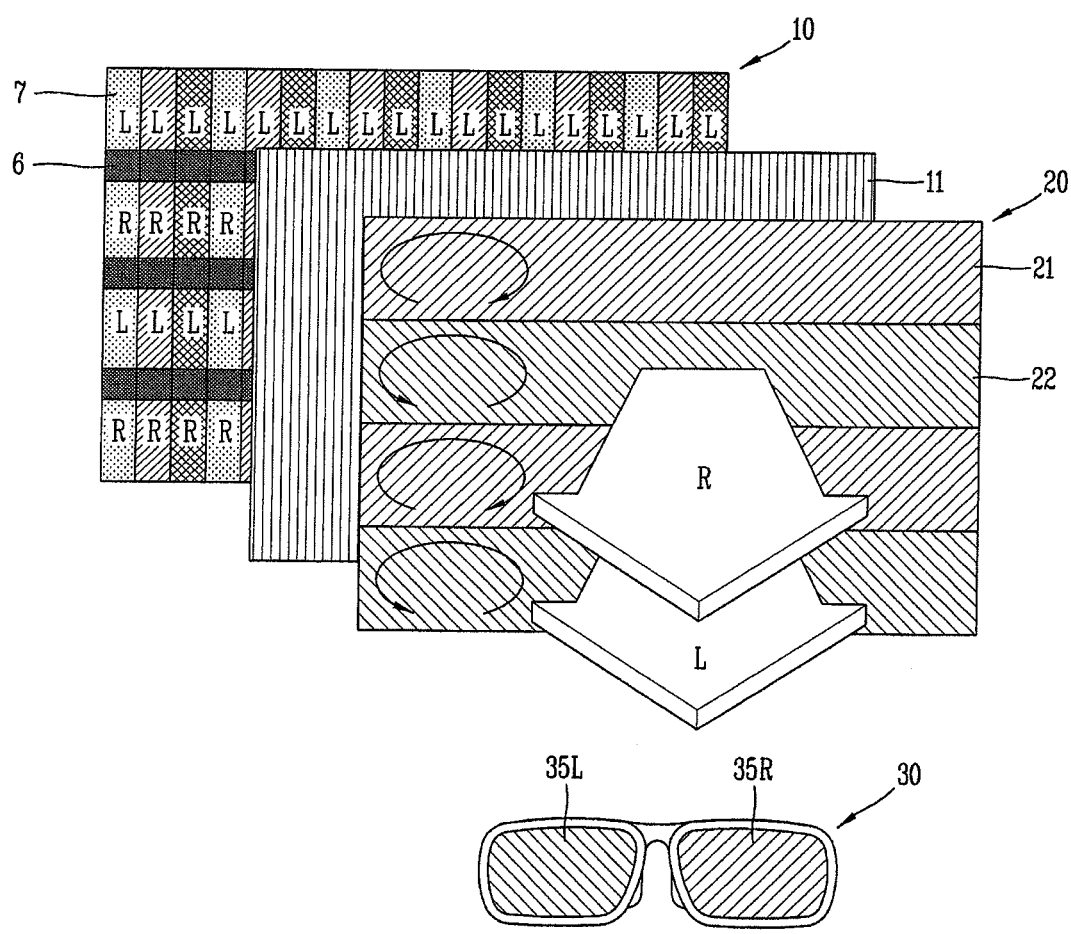
FIG. 1 is an exemplary view schematically illustrating the structure of a related art polarized glasses type stereoscopic image display device.
Figure 2:
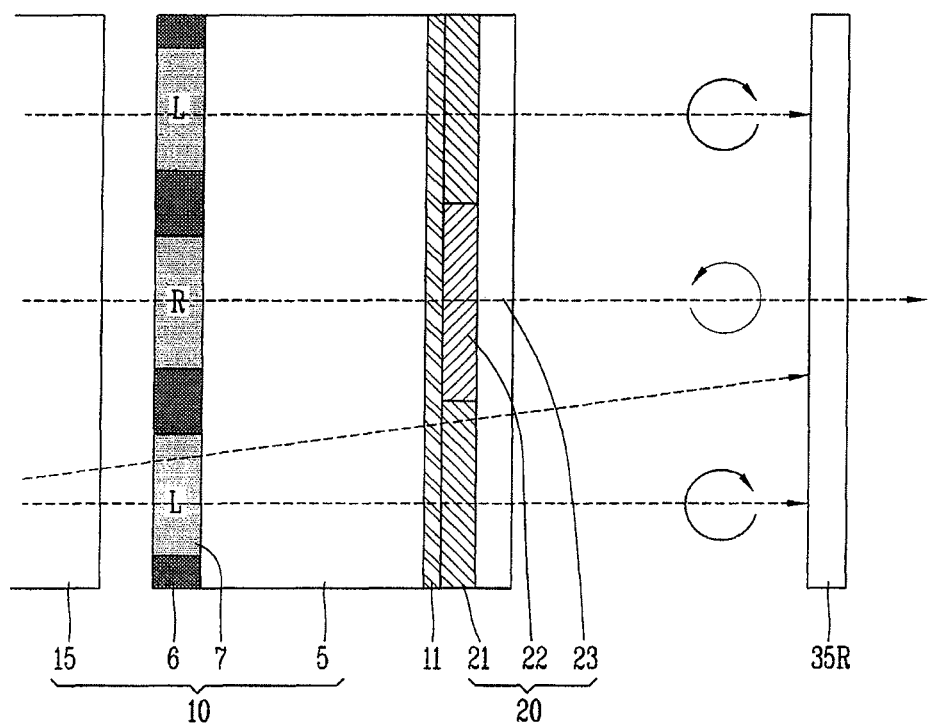
FIG. 2 is a cross-sectional view schematically illustrating the structure of a related art polarized glasses type stereoscopic image display device.
Figure 3:
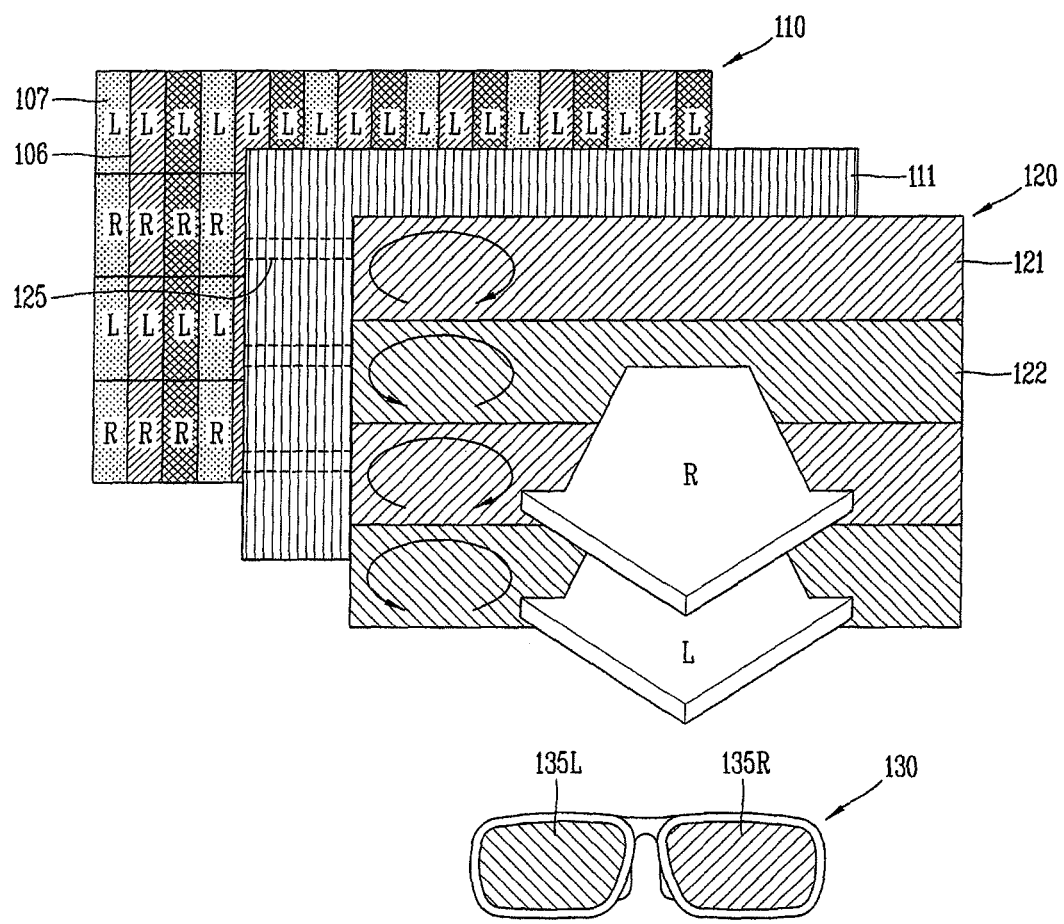
FIG. 3 is an exemplary view schematically illustrating the structure of a polarized glasses type stereoscopic image display device according to a first embodiment of the present invention.

FIG. 3 is an exemplary view schematically illustrating the structure of a polarized glasses type stereoscopic image display device according to a first embodiment of the present invention.

Figure 4:
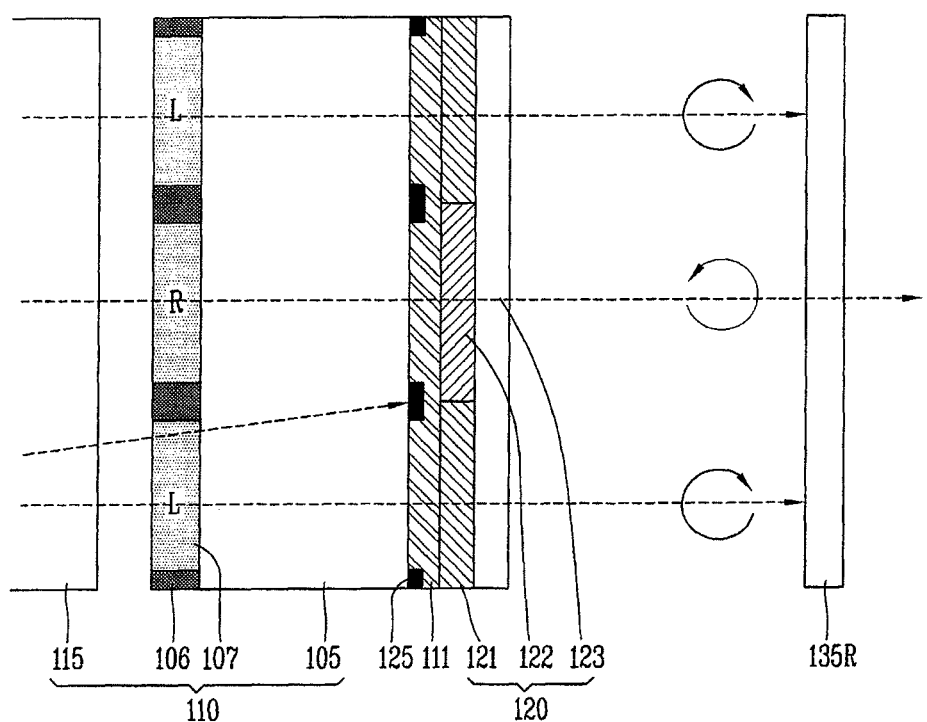
FIG. 4 is a cross-sectional view schematically illustrating the structure of a polarized glasses type stereoscopic image display device according to a first embodiment of the present invention.

FIG. 4 is a cross-sectional view schematically illustrating the structure of a polarized glasses type stereoscopic image display device according to a first embodiment of the present invention, in which the process of viewing a stereoscopic image in the right eye lens of stereoscopic viewing glasses is illustrated as an example.

Referring to FIGS. 3 and 4, the polarized glasses type is a scheme of using a polarization phenomenon in which a patterned retarder 120 is disposed on a front surface of the display panel 110 to spatially divide the left and right eye images.

The patterned retarder 120 of the polarized glasses type stereoscopic image display device may be characterized in that a predetermined pattern is formed based on the location, thereby allowing the L, R images (L, R) to implement a polarization state in perpendicular directions to each other.

For example, the patterned retarder 120 may include a glass-made substrate 123 or have a film shape, and though not shown in detail in the drawing, an alignment layer and a birefringent layer may be formed thereon. The alignment layer and birefringent layer has a regular pattern of the first region 121 and a regular pattern of the second region 122. The first region 121 and second region 122 are formed with alternating strips to correspond to the image lines of the display panel 110. At this time, the first region 121 and second region 122 may have different alignment directions, for example, alignment directions of about 45 and 135 degrees, respectively.

The display panel 110 may be configured with any one of a liquid crystal display (LCD), a field emission display (FED), a plasma display panel (PFP), and an electroluminescent display (EL). Furthermore, when the display panel 110 is configured with a liquid crystal display, an upper polarizing plate 111 having a light absorbing axis in the horizontal direction is disposed, for example, between the display panel 110 and the patterned retarder 120. Furthermore, though not shown in the drawing, a backlight unit is disposed at a lower portion of the display panel 110, and a lower polarizing plate is disposed between the display panel 110 and backlight unit.

When the display panel 110 is configured with a liquid crystal display, the display panel 110 may be configured with two glass substrates 105, 115, and a liquid crystal layer formed between them.

Though not shown in the drawing, a thin-film transistor array is formed on the lower glass substrate 115. The thin-film transistor array may include a plurality of data lines to which R, G and B data voltages are supplied, a plurality of gate lines crossed to the data lines to which gate pulses are supplied, a plurality of thin-film transistors formed at crossed portions of the data lines and gate lines, a plurality of pixel electrodes for charging a data voltage to liquid crystal cells, a storage capacitor connected to the pixel electrode to maintain the voltage of the liquid crystal cells, and the like.

A color filter array is formed on the upper glass substrate 105, and the color filter array may include a black matrix 106, a color filter 107, and the like. A common electrode facing the pixel electrode to form an electric field may be formed on the upper glass substrate 105 in a vertical electric field driving method such as a twisted nematic (TN) mode and a vertical alignment (VA) mode, and may be formed on the lower glass substrate 115 together with the pixel electrode in a horizontal electric field driving method such as an in-plane switching (IPS) mode and a fringe field switching (FFS) mode. An alignment layer for setting a pretilt angle of the liquid crystal at an inner surface brought into contact with the liquid crystal layer is formed on the glass substrates 105, 115, and a column spacer for maintaining a cell gap of the liquid crystal cells is formed between the glass substrates 105, 115.

The upper polarizing plate 111 is an analyzer adhered to a rear surface of the upper glass substrate 105 of the display panel 110 to transmit only specific linear polarized light from incident light passing through the liquid crystal layer of the display panel 110. The display panel 110 adhered to the upper polarizing plate 111 is bonded to the patterned retarder 120 through a predetermined adhesion layer.

The scheme of arranging L, R images (L, R) for each line is currently widely used. As illustrated in the drawing, the L image (L) is disposed in the odd line, and the R image (R) is disposed in the even line in the vertical direction. In this manner, when the L, R images (L, R) are displayed on the display panel 110, the user wears stereoscopic image viewing glasses 130 to view the L, R images (L, R) in a separate manner, thereby enjoying 3D images.

In other words, as described above, the patterned retarder 120 may include regular patterns of the first region 121 and regular patterns of the second region 122 which are alternatively disposed for each line. For example, the regular patterns of the first region 121 and the regular patterns of the second region 122 may be disposed for each line to have +45 and −45 degrees, respectively, with respect to an absorption axis of the upper polarizing plate 111. The regular patterns of the first region 121 and the regular patterns of the second region 122 delay the phases of light by $+\lambda/4$ and $-\lambda/4$, respectively, using a birefringent medium. An optical axis of the regular patterns of the first region 121 and an optical axis of the regular patterns of the second region 122 cross at right angles to each other. Accordingly, the regular patterns of the first region 121 are disposed to face lines displayed with the L image (L) of the display panel 110 to convert light of the L image (L) into a first polarization light (circular or linear polarization light). Furthermore, the regular patterns of the second region 122 are disposed to face lines displayed with the R image (R) of the display panel 110 to convert light of the R image (R) into a second polarization light (circular or linear polarization light). For example, the regular patterns of the first region 121 may be implemented by a polarization filter through which left-handed circular polarization passes, and the regular patterns of the second region 122 may be implemented by a polarization filter through which right-handed circular polarization passes.

At this time, a polarization film through which only a first polarization component passes is adhered to the left eye lens 135L of the stereoscopic image viewing glasses 130, and a polarization film through which only a second polarization component passes is adhered to the right eye lens 135R of the stereoscopic image viewing glasses 130. Accordingly, the user wearing the stereoscopic image viewing glasses 130 views only the L image (L) through the left eye and views only the R image (R) through the right eye, thereby feeling an image displayed on the display panel 110 as a stereoscopic image.

Here, an example is illustrated that a circular polarization scheme is used for the polarized glasses scheme but the present invention is not limited to this, a linear polarization scheme may be also used for the polarized glasses scheme.

A polarized glasses type stereoscopic image display device having the foregoing configuration according to a first embodiment of the present invention may be characterized in that a light blocking pattern 125 referred to as a black strip is formed on a rear surface of the 105 between the regions 121, 122 of the patterned retarder 120 to solve a vertical viewing angle problem.

Accordingly, in the scheme of differently arranging the L, R images (L, R) for each line, vertically adjacent L, R images (L, R) are correctly divided into the L image (L) and the R image (R) by the light blocking pattern 125, and thus only the L image (L) enters into the left eye and only the R image (R) enters into the right eye. In particular, for the light blocking pattern 125 according to a first embodiment of the present invention, it is not required to increase a width of the black matrix 106, and a distance to the patterned retarder 120 may be reduced compared to the existing black matrix scheme, thereby effectively enhancing the vertical viewing angle without reducing the aperture ratio.

However, in the first embodiment, when the foregoing light blocking pattern 125 is formed of resin material such as Black Matrix, it has a disadvantage the light blocking pattern 125 may be lost due to an abrasive belt or the rework of the upper polarizing plate 111 may be difficult during the cleaning process.

Figure 5:
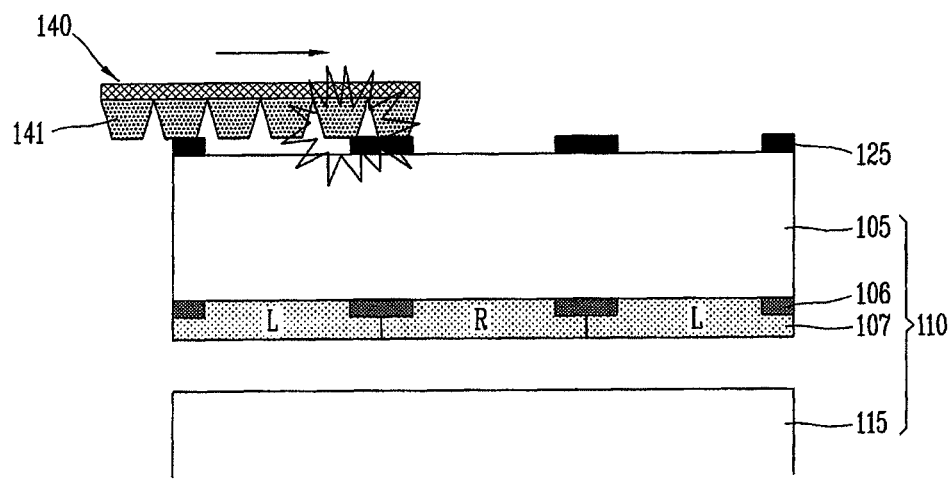
FIG. 5 is an exemplary view illustrating the generation of a scratch on a light blocking pattern by an abrasive belt.

FIG. 5 is an exemplary view illustrating the generation of a scratch on a light blocking pattern by an abrasive belt.

Referring to FIG. 5, the upper glass substrate 105 and lower glass substrate 115 are formed on a mother substrate having a large area, respectively. In other words, a plurality of unit panels having panel region are formed on a mother substrate having a large area, respectively, and a thin-film transistor or color filter layer is formed on the panel regions, respectively.

In this manner, the display panel 110 is formed on a plurality of panel regions, respectively, and the glass substrates 105, 115 should be processed, cut and divided into a plurality of unit display panels 110.

In this case, cleaning is carried out to remove glass flakes, adherent foreign substances or the like that have been produced during the processing and cutting process, and for this purpose, the abrasive belt 140 may include an abrasive 141 with $Al_2O_3$ having a hardness of about 3. For reference, the hardness is on the basis of Mohs hardness scale indicating a certain scratch resistance quality, and the abrasive 141 may have a hardness of 5H-6H when based on a pencil's hardness.

At this time, a scratch may be produced or the light blocking pattern 125 may be lost due to the abrasive belt 140 on a surface of the light blocking pattern 125 with resin Black Matrix (herein after, BM) having a lower hardness than that of the abrasive 141 of the abrasive belt 140. In particular, when the light blocking pattern 125 with resin BM is formed at a thickness of about 1 μm, the step is high relatively, thereby increasing a scratch generation probability.

Therefore, the light blocking patterns with a metal are applied to the second embodiment.

The hardness scale of metal used for the light blocking pattern is higher than that of the abrasive 141, thereby enduring the polishing of abrasive belt. And it can be stepped down of light blocking pattern because the metal having high hardness scale is used for the light blocking pattern.

And the electrostatic discharging layer is deposited on the entire surface of the light blocking pattern to stepped down of the light blocking pattern and discharging the electrostatic generated in the process of cutting or scribing. The electrostatic discharging layer is made of transparent conductive electrode such as ITO or IZO. As a result, a scratch due to an abrasive belt may be prevented by forming a light blocking pattern with a metal having a large hardness instead of resin BM and reducing a step height with the light blocking pattern, and it will be described in detail through the following second and third embodiments of the present invention.

Figure 6:
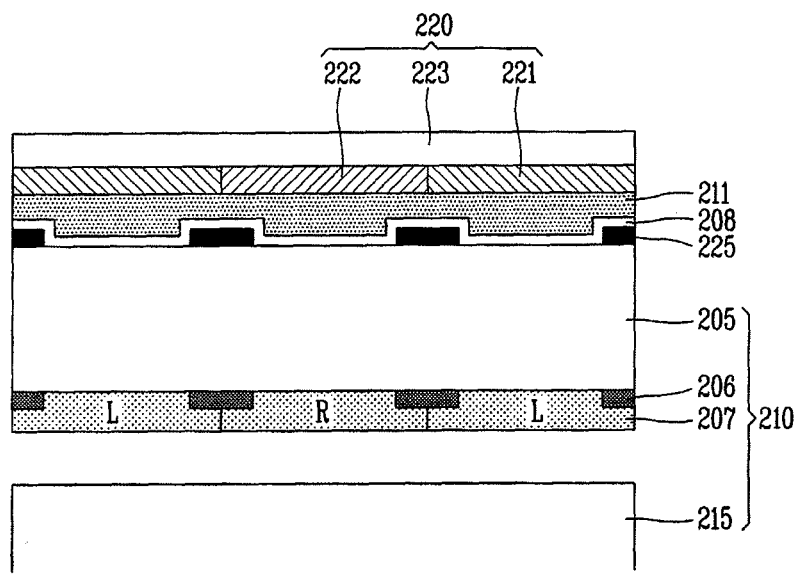
FIG. 6 is a cross-sectional view schematically illustrating a polarized glasses type stereoscopic image display device according to a second embodiment of the present invention.

FIG. 6 is a cross-sectional view schematically illustrating a polarized glasses type stereoscopic image display device according to a second embodiment of the present invention, and a case of forming a light blocking pattern with a metal having a large hardness and then depositing transparent conductive material for the rear surface ITO over an entire surface thereof is illustrated as an example.

Figure 7:
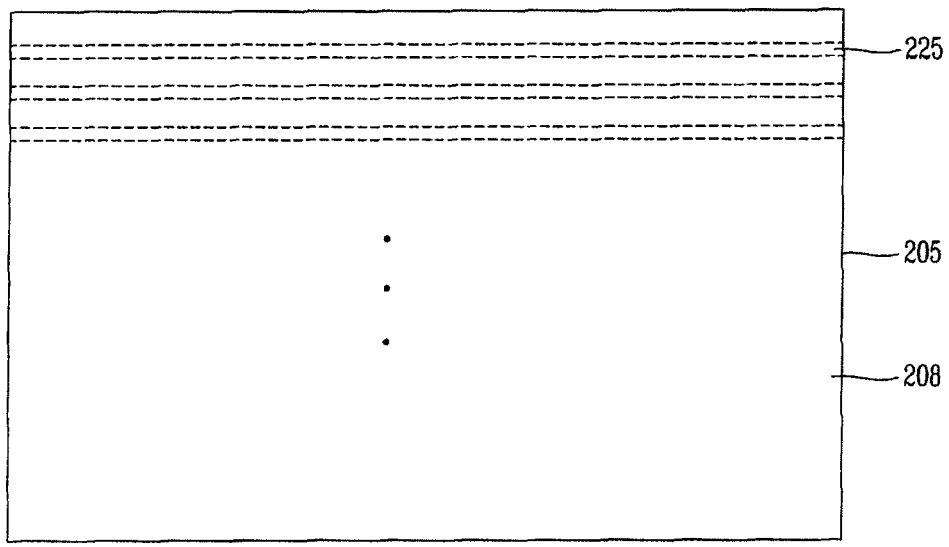
FIG. 7 is a plan view schematically illustrating a rear surface of the upper glass substrate in a polarized glasses type stereoscopic image display device according to a second embodiment of the present invention illustrated in FIG. 6.

Furthermore, FIG. 7 is a plan view schematically illustrating a rear surface of the upper glass substrate in a polarized glasses type stereoscopic image display device according to a second embodiment of the present invention illustrated in FIG. 6.

Referring to FIGS. 6 and 7, as described above, the polarized glasses type is a scheme of using a polarization phenomenon in which a patterned retarder 220 is disposed on a front surface of the display panel 210 to spatially divide the left and right eye images.

The patterned retarder 220 of the polarized glasses type stereoscopic image display device may be characterized in that a predetermined pattern is formed based on the location, thereby allowing the L, R images (L, R) to implement a polarization state in perpendicular directions to each other.

For example, the patterned retarder 220 may include a glass-made substrate 223 or have a film shape, and though not shown in detail in the drawing, an alignment layer and a birefringent layer may be formed thereon. The alignment layer and birefringent layer has a regular pattern of the first region 221 and a regular pattern of the second region 222. The first region 221 and second region 222 are formed with alternating strips to correspond to the image lines of the display panel 210. At this time, the first region 221 and second region 222 may have different alignment directions, for example, alignment directions of about 45 and 135 degrees, respectively.

The display panel 210 may be configured with any one of a liquid crystal display, a field emission display, a plasma display panel, and an electroluminescent display. Furthermore, when the display panel 210 is configured with a liquid crystal display, an upper polarizing plate 211 having a light absorbing axis in the horizontal direction is disposed, for example, between the display panel 210 and the patterned retarder 220. Furthermore, though not shown in the drawing, a backlight unit is disposed at a lower portion of the display panel 210, and a lower polarizing plate is disposed between the display panel 210 and backlight unit.

When the display panel 210 is configured with a liquid crystal display, the display panel 210 may be configured with two glass substrates 205, 215, and a liquid crystal layer formed between them.

Though not shown in the drawing, a thin-film transistor array is formed on the lower glass substrate 215, namely, array substrate. The thin-film transistor array may include a plurality of data lines to which R, G and B data voltages are supplied, a plurality of gate lines crossed to the data lines to which gate pulses are supplied, a plurality of thin-film transistors formed at crossed portions of the data lines and gate lines, a plurality of pixel electrodes for charging a data voltage to liquid crystal cells, a storage capacitor connected to the pixel electrode to maintain the voltage of the liquid crystal cells, and the like. A color filter array is formed on the upper glass substrate 205, namely, color filter substrate, and the color filter array may include a black matrix 206, a color filter 207, and the like. A common electrode facing the pixel electrode to form an electric field may be formed on the upper glass substrate 205 in a vertical electric field driving method such as a twisted nematic mode and a vertical alignment mode, and may be formed on the lower glass substrate 215 together with the pixel electrode in a horizontal electric field driving method such as an in-plane switching mode and a fringe field switching mode. An alignment layer for setting a pretilt angle of the liquid crystal at an inner surface brought into contact with the liquid crystal layer is formed on the glass substrates 205, 215, and a column spacer for maintaining a cell gap of the liquid crystal cells is formed between the glass substrates 205, 215.

The upper polarizing plate 211 is an analyzer adhered to a rear surface of the upper glass substrate 205 of the display panel 210 to transmit only specific linear polarized light from incident light passing through the liquid crystal layer of the display panel 210. The display panel 210 adhered to the upper polarizing plate 211 is bonded to the patterned retarder 220 through a predetermined adhesion layer (not shown).

A polarized glasses type stereoscopic image display device having the foregoing configuration according to a second embodiment of the present invention may be characterized in that a light blocking pattern 225 in a strip shape is formed on a rear surface of the 205 between the regions 221, 222 of the patterned retarder 220 to solve a vertical viewing angle problem similarly to the foregoing first embodiment of the present invention.

Accordingly, in the scheme of differently arranging the L, R images (L, R) for each line, vertically adjacent L, R images (L, R) are correctly divided into the L image (L) and the R image (R) by the light blocking pattern 225, and thus only the L image (L) enters into the left eye and only the R image (R) enters into the right eye.

For the light blocking pattern 225 according to a second embodiment of the present invention, a distance to the patterned retarder 220 may be reduced compared to the existing black matrix scheme, thereby effectively enhancing the vertical viewing angle without reducing the aperture ratio. Accordingly, it may be possible to enhance the 3D image quality of a stereoscopic display device, and reduce the cost of a backlight unit due to the enhancement of an aperture ratio.

In particular, in case of the second embodiment of the present invention, contrary to the foregoing first embodiment of the present invention, the light blocking pattern 225 is formed of a metal having a large hardness such as Cr, Fe, Co, Ta, Mo, MoTi, and the like, and then the electrostatic discharging layer such as rear surface ITO 208 is deposited on a front surface thereof, thereby preventing a scratch of the light blocking pattern 225 due to an abrasive belt. As a result, it may be possible to enhance process yield as well as facilitate the rework of the polarizing plate 211 since the light blocking pattern 225 is formed of a metal, thereby providing an effect of reducing fabrication cost. For reference, since a cohesion force of metal binding to resin BM is strong, a phenomenon will not be occurred that the light blocking pattern 225 is torn out during the rework process of the polarizing plate 211 as in the foregoing first embodiment of the present invention.

FIGS. 8A through 8E are cross-sectional views sequentially illustrating a method of fabricating a polarized glasses type stereoscopic image display device according to a second embodiment of the present invention illustrated in FIG. 6, and a fabrication method in case of configuring the display panel with a liquid crystal display is illustrated as an example.

Figure 8A:
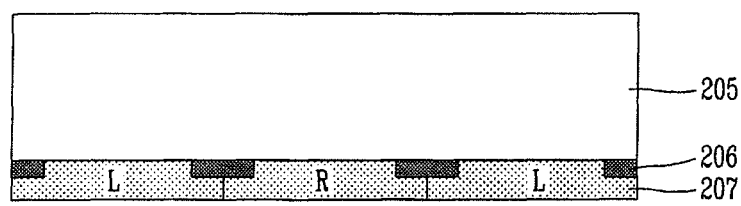
FIGS. 8A through 8E are cross-sectional views sequentially illustrating a method of fabricating a polarized glasses type stereoscopic image display device according to a second embodiment of the present invention illustrated in FIG. 6.

As illustrated in FIG. 8A, a color filter 207 configured with red, green and blue sub-color filters for implementing colors on the color filter substrate 205 which is an upper glass substrate, a black matrix 206 for dividing between the sub-color filters and blocking light passing through the liquid crystal layer, and a transparent common electrode for applying a voltage to the liquid crystal layer are formed through the color filter process. At this time, when fabricating a horizontal electric field driving type liquid crystal display, the common electrode is formed on a thin-film transistor array substrate formed with pixel electrodes through an array process which will be described later.

Then, though not shown in the drawing, a plurality of gate lines and data lines for defining pixel regions on the array substrate which is a lower glass substrate are formed and thin-film transistors which are driving elements connected to the gate lines and data lines are formed on the pixel regions, respectively, through the array process. Furthermore, pixel electrodes connected to the thin-film transistors for driving the liquid crystal layer when a signal is applied through the thin-film transistors are formed through the array process.

Figure 8B:
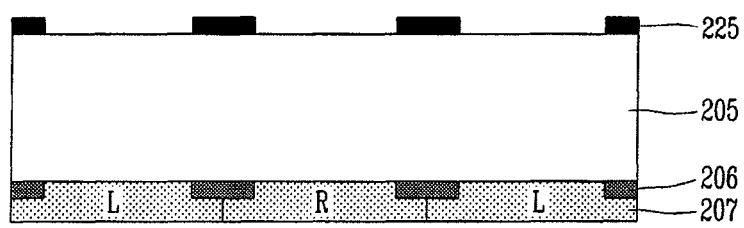

Then, as illustrated in FIG. 8B, the light blocking pattern 225 having a thickness of 300-1000 Å is formed of a metal having a large hardness on a rear surface of the color filter substrate 205 that has completed the color filter process.

The metal having a large hardness may include Cr, Fe, Co, Ta, Mo, MoTi, and the like, and the hardness of the metal may have a value of 5 to 10 based on Mohs hardness.

At this time, the light blocking pattern 225 may be formed in a stripe shape on a rear surface of the color filter substrate 205 between vertically adjacent pixels, namely, patterned retarder regions.

Figure 8C:
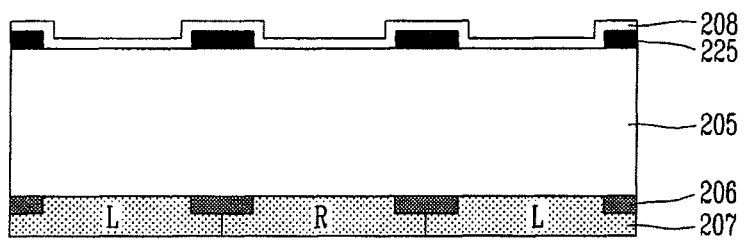

Then, as illustrated in FIG. 8C, a rear surface ITO 208 made of ITO is deposited over an entire surface of the color filter substrate 205 formed with the light blocking pattern 225.

At this time, low reflection can be implemented through a structure laminated with the light blocking pattern 225 and rear surface ITO 208, and for example, low reflection can be implemented when the light blocking pattern 225 is formed with MoTi having a thickness of about 100 Å and the rear surface ITO 208 is formed with a thickness of about 300 Å.

The low reflection can be attained by the Bragg's law. The incident lights are reflected from the upper rear surface ITO 208 and the lower light blocking pattern 225. And the light reflected form the rear surface ITO 208 and the light reflected from the light blocking pattern 225 may be interfered destructively.

Figure 8D:
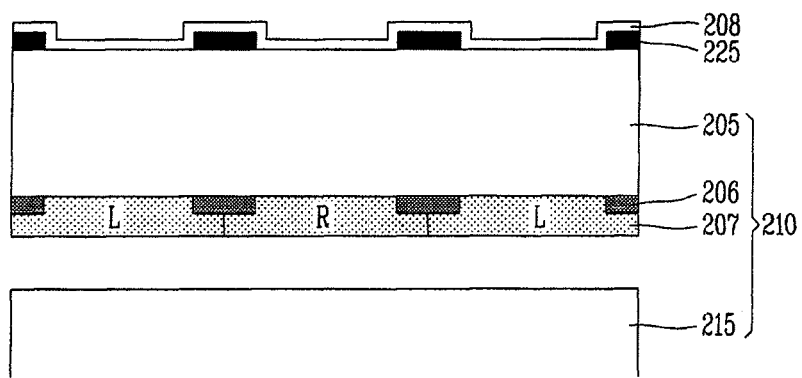

Then, as illustrated in FIG. 8D, a predetermined seal pattern (not shown) is formed on the color filter substrate 205 with a sealing material while at the same time liquid crystal is dropped on the array substrate 215 to form a liquid crystal layer (not shown), and then the color filter substrate 205 and array substrate 215 are bonded together to fabricate a predetermined display panel 210.

At this time, it may be also possible that the color filter substrate 205 and array substrate 215 are bonded together to fabricate a predetermined display panel 210 and then the foregoing light blocking pattern 225 and rear surface ITO 208 are formed on a rear surface of the color filter substrate 205.

Figure 8E:
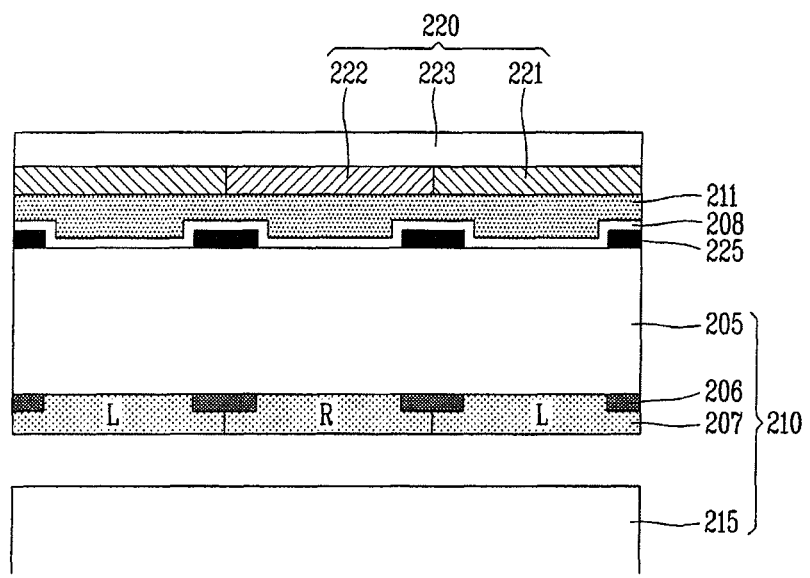

Then, as illustrated in FIG. 8E, the upper polarizing plate 211 is adhered to a rear surface of the color filter substrate 205 of the bonded display panel 210. Then, the display panel 210 adhered to the upper polarizing plate 211 is bonded together with the pattered retarder 220 through a predetermined adhesion layer (not shown) to constitute a polarized glasses type stereoscopic image display device.

Figure 9:
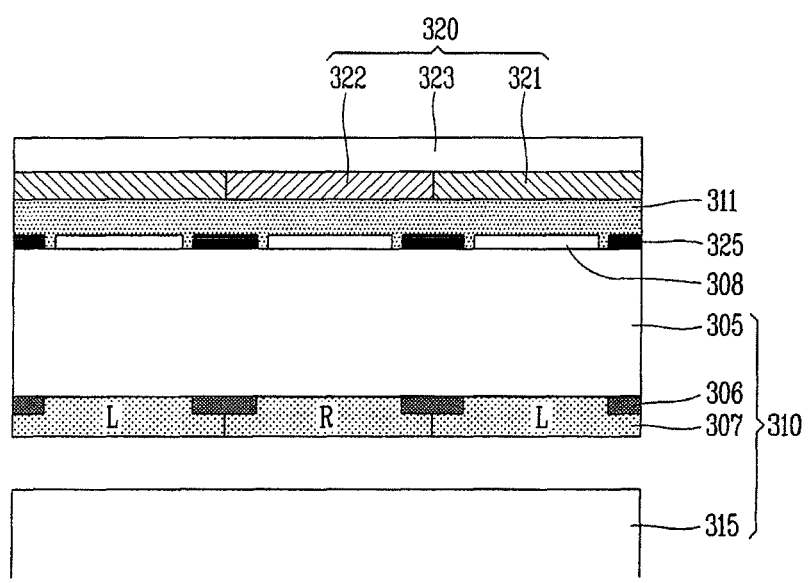
FIG. 9 is a cross-sectional view schematically illustrating a polarized glasses type stereoscopic image display device according to a third embodiment of the present invention.

FIG. 9 is a cross-sectional view schematically illustrating a polarized glasses type stereoscopic image display device according to a third embodiment of the present invention, and a case where a light blocking pattern is formed of a metal having a large hardness and then a electrostatic discharging patterns, that is rear surface ITO patterns are formed between the light blocking patterns using a lift-off method is illustrated as an example. And the rear surface ITO patterns are connected each other electrically to discharge the electrostatic generated in the process of cutting or scribing.

Figure 10:
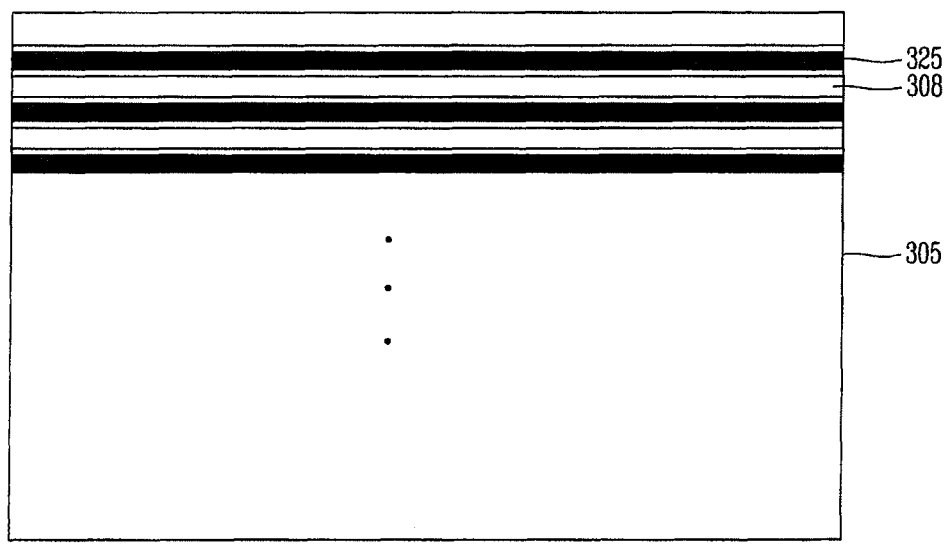
FIG. 10 is a plan view schematically illustrating a rear surface of the upper glass substrate in a polarized glasses type stereoscopic image display device according to a third embodiment of the present invention illustrated in FIG. 9.

Furthermore, FIG. 10 is a plan view schematically illustrating a rear surface of the upper glass substrate in a polarized glasses type stereoscopic image display device according to a third embodiment of the present invention illustrated in FIG. 9.

Referring to FIGS. 9 and 10, as described above, the polarized glasses type is a scheme of using a polarization phenomenon in which a patterned retarder 320 is disposed on a outer surface of the display panel 310 to spatially divide the left and right eye images.

The patterned retarder 320 of the polarized glasses type stereoscopic image display device may be characterized in that a predetermined pattern is formed based on the location, thereby allowing the L, R images (L, R) to implement a polarization state in perpendicular directions to each other.

For example, the patterned retarder 320 may include a glass-made substrate 323 or have a film shape, and though not shown in detail in the drawing, an alignment layer and a birefringent layer may be formed thereon. The alignment layer and birefringent layer has a regular pattern of the first region 321 and a regular pattern of the second region 322. The first region 321 and second region 322 are formed with alternating strips to correspond to the image lines of the display panel 310. At this time, the first region 321 and second region 322 may have different alignment directions, for example, alignment directions of about 45 and 135 degrees, respectively.

The display panel 310 may be configured with any one of a liquid crystal display, a field emission display, a plasma display panel, and an electroluminescent display. Furthermore, when the display panel 310 is configured with a liquid crystal display, an upper polarizing plate 311 having a light absorbing axis in the horizontal direction is disposed, for example, between the display panel 310 and the patterned retarder 320. Furthermore, though not shown in the drawing, a backlight unit is disposed at a lower portion of the display panel 310, and a lower polarizing plate is disposed between the display panel 310 and backlight unit.

When the display panel 310 is configured with a liquid crystal display, the display panel 310 may be configured with two glass substrates 305, 315, and a liquid crystal layer formed between them.

Though not shown in the drawing, a thin-film transistor array is formed on the lower glass substrate 315, namely, array substrate. The thin-film transistor array may include a plurality of data lines to which R, G and B data voltages are supplied, a plurality of gate lines crossed to the data lines to which gate pulses are supplied, a plurality of thin-film transistors formed at crossed portions of the data lines and gate lines, a plurality of pixel electrodes for charging a data voltage to liquid crystal cells, a storage capacitor connected to the pixel electrode to maintain the voltage of the liquid crystal cells, and the like. A color filter array is formed on the upper glass substrate 305, namely, color filter substrate, and the color filter array may include a black matrix 306, a color filter 307, and the like. A common electrode facing the pixel electrode to form an electric field may be formed on the upper glass substrate 305 in a vertical electric field driving method such as a twisted nematic mode and a vertical alignment mode, and may be formed on the lower glass substrate 315 together with the pixel electrode in a horizontal electric field driving method such as an in-plane switching mode and a fringe field switching mode. An alignment layer for setting a pretilt angle of the liquid crystal at an inner surface brought into contact with the liquid crystal layer is formed on the glass substrates 305, 315, and a column spacer for maintaining a cell gap of the liquid crystal cells is formed between the glass substrates 305, 315.

The upper polarizing plate 311 is an analyzer adhered to a rear surface of the upper glass substrate 305 of the display panel 310 to transmit only specific linear polarized light from incident light passing through the liquid crystal layer of the display panel 310. The display panel 310 adhered to the upper polarizing plate 311 is bonded to the patterned retarder 320 through a predetermined adhesion layer (not shown).

A polarized glasses type stereoscopic image display device having the foregoing configuration according to a third embodiment of the present invention may be characterized in that a light blocking pattern 325 referred to as a black strip in a strip shape is formed on a rear surface of the 305 between the regions 321, 322 of the patterned retarder 320 to solve a vertical viewing angle problem similarly to the foregoing first and second embodiments of the present invention.

Accordingly, in the scheme of differently arranging the L, R images (L, R) for each line, vertically adjacent L, R images (L, R) are correctly divided into the L image (L) and the R image (R) by the light blocking pattern 325, and thus only the L image (L) enters into the left eye and only the R image (R) enters into the right eye.

For the light blocking pattern 325 according to a third embodiment of the present invention, a distance to the patterned retarder 320 may be reduced compared to the existing black matrix scheme, thereby effectively enhancing the vertical viewing angle without reducing the aperture ratio. Accordingly, it may be possible to enhance the 3D image quality of a stereoscopic display device, and reduce the cost of a backlight unit due to the enhancement of an aperture ratio.

In particular, in case of the third embodiment of the present invention, contrary to the foregoing second embodiment of the present invention, the light blocking pattern 325 is formed of a metal having a large hardness and then the rear surface ITO 308 is formed between the light blocking patterns 325 using a lift-off method, thereby preventing a scratch of the light blocking pattern 325 due to an abrasive belt. In this case, a step height is not formed between the light blocking pattern 325 and rear surface ITO 308, thereby obtaining a better effect than that of the foregoing second embodiment of the present invention. As a result, it may be possible to enhance process yield as well as facilitate the rework of the polarizing plate 311 since the light blocking pattern 325 is formed of a metal, thereby providing an effect of reducing fabrication cost.

FIGS. 11A through 11G are cross-sectional views sequentially illustrating a method of fabricating a polarized glasses type stereoscopic image display device according to a third embodiment of the present invention illustrated in FIG. 9, and a fabrication method in case of configuring the display panel with a liquid crystal display is illustrated as an example.

Figure 11A:
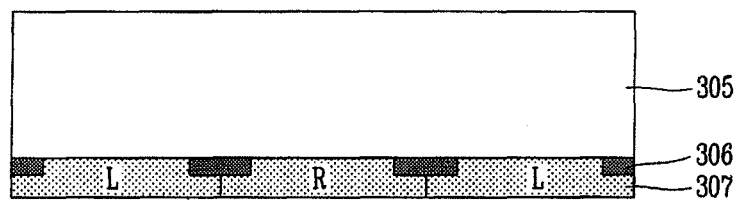
FIGS. 11A through 11G are cross-sectional views sequentially illustrating a method of fabricating a polarized glasses type stereoscopic image display device according to a third embodiment of the present invention illustrated in FIG. 9.

As illustrated in FIG. 11A, a color filter 307 configured with red, green and blue sub-color filters for implementing colors on the color filter substrate 305 which is an upper glass substrate, a black matrix 306 for dividing between the sub-color filters and blocking light passing through the liquid crystal layer, and a transparent common electrode for applying a voltage to the liquid crystal layer are formed through the color filter process. At this time, when fabricating a horizontal electric field driving type liquid crystal display, the common electrode is formed on a thin-film transistor array substrate formed with pixel electrodes through an array process which will be described later.

Then, though not shown in the drawing, a plurality of gate lines and data lines for defining pixel regions on the array substrate which is a lower glass substrate are formed and thin-film transistors which are driving elements connected to the gate lines and data lines are formed on the pixel regions, respectively, through the array process. Furthermore, pixel electrodes connected to the thin-film transistors for driving the liquid crystal layer when a signal is applied through the thin-film transistors are formed through the array process.

Figure 11B:

Then, as illustrated in FIG. 11B, the first metal layer 350 having a thickness of 300-1000 Å is formed of a metal having a large hardness on a rear surface of the color filter substrate 305 that has completed the color filter process.

The metal having a large hardness may include Cr, Fe, Co, Ta, Mo, MoTi, and the like, and the hardness of the metal may have a value of 5 to 10 based on Mohs hardness.

Then, a photosensitive layer made of a photosensitive material such as photoresist is formed on the first metal layer 350, and then the photosensitive layer is patterned through a photolithography process to form a predetermined photosensitive layer pattern 360.

Figure 11C:
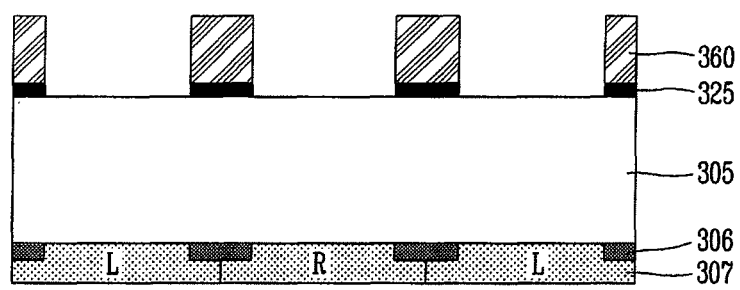

Subsequently, the first metal layer at a lower portion thereof is selectively etched using the photosensitive layer pattern 360 as a mask to form a light blocking pattern 325 made of a metal having a large hardness, as illustrated in FIG. 11C.

At this time, the light blocking pattern 325 may be formed in a stripe shape on a rear surface of the color filter substrate 305 between vertically adjacent pixels, namely, patterned retarder regions.

Figure 11D:
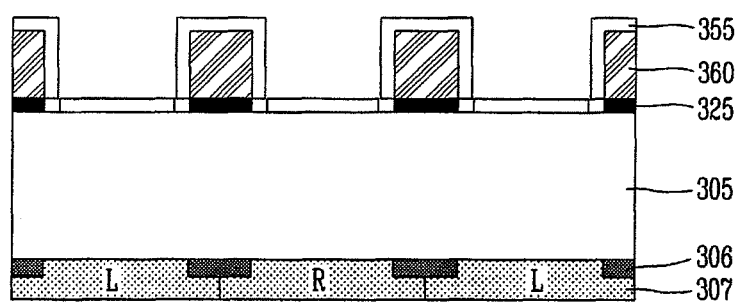

Subsequently, as illustrated in FIG. 11D, a second metal layer 355 made of ITO is deposited over an entire surface of the color filter substrate 305 formed with the light blocking pattern 325 in a state that the photosensitive layer pattern 360 is remained. At this time, the second metal layer 355 may be formed with a thickness of 300-1000 Å similarly to the first metal layer.

Figure 11E:
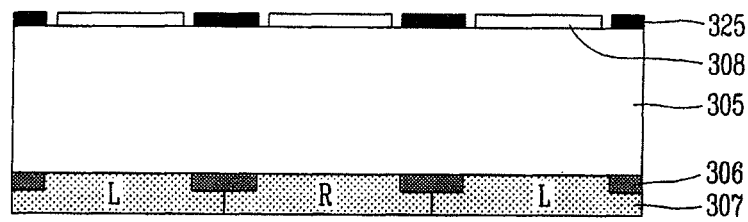

Then, as illustrated in FIG. 11E, the photosensitive layer pattern is removed through the lift-off method, and at this time the second metal layer remained on the photosensitive layer pattern is removed together with the photosensitive layer pattern.

At this time, the second metal layer remained in a stripe shape between the light blocking patterns 325 forms the rear surface ITO 308.

At this time, in order to implement a low reflection structure as illustrated in the foregoing first embodiment of the present invention, an ITO layer may be additionally laminated on a front surface of the color filter substrate 305 formed with the light blocking pattern 325 and rear surface ITO 308. Otherwise, ITO may be additionally deposited on the first metal layer with a metal having a large hardness during the formation of the foregoing light blocking pattern 325 to implement the low reflection structure.

Figure 11F:
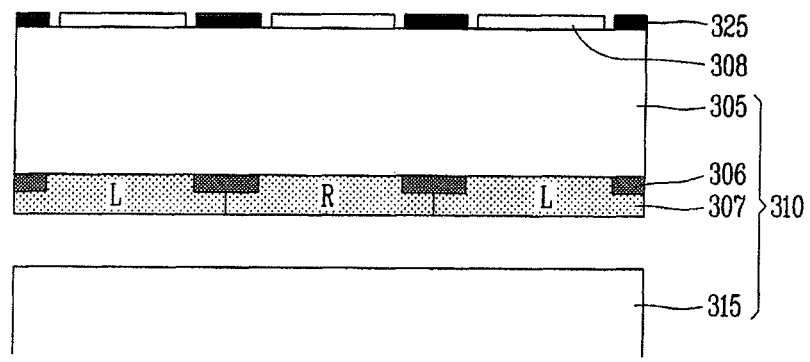

Then, as illustrated in FIG. 11F, a predetermined seal pattern (not shown) is formed on the color filter substrate 305 with a sealing material while at the same time liquid crystal is dropped on the array substrate 315 to form a liquid crystal layer (not shown), and then the color filter substrate 305 and array substrate 315 are bonded together to fabricate a predetermined display panel 310.

At this time, it may be also possible that the color filter substrate 305 and array substrate 315 are bonded together to fabricate a predetermined display panel 310 and then the foregoing light blocking pattern 325 and rear surface ITO 308 are formed on a rear surface of the color filter substrate 305.

Figure 11G:
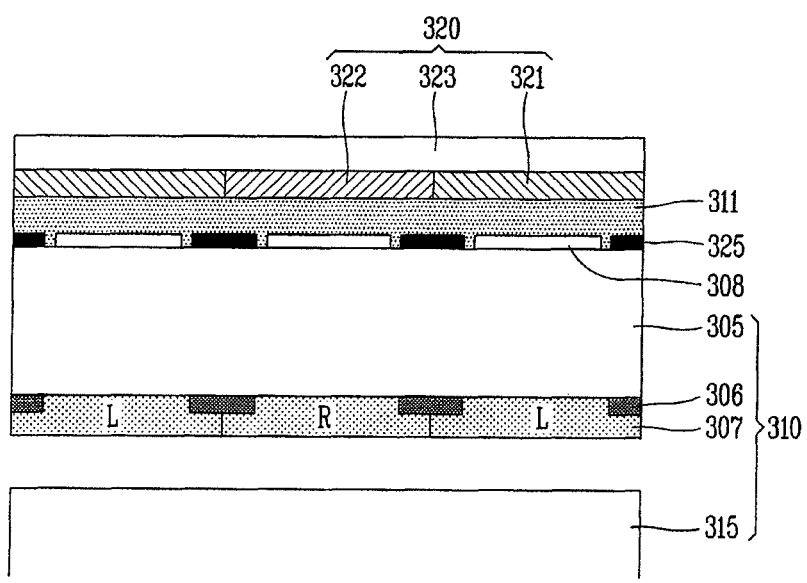

Then, as illustrated in FIG. 11G, the upper polarizing plate 311 is adhered to a rear surface of the color filter substrate 305 of the bonded display panel 310. Then, the display panel 310 adhered to the upper polarizing plate 311 is bonded together with the pattered retarder 320 through a predetermined adhesion layer (not shown) to constitute a polarized glasses type stereoscopic image display device.

Although many subject matters have been specifically disclosed in the foregoing description, they should be construed as an illustration of preferred embodiments rather than a limitation to the scope of invention. Consequently, the invention should not be determined by the embodiments disclosed herein but should be determined by the claims and the equivalents thereof.

What is claimed is:

1. A method of fabricating a polarized glasses type stereoscopic image display device, the method comprising:
forming a plurality of light blocking patterns in a stripe shape on a rear surface of the color filter substrate on which a color filter layer is formed;
forming an electrostatic discharging layer covering the plurality of light blocking patterns and reducing a step height of the plurality of light blocking patterns;
bonding the color filter substrate formed with the plurality of light blocking patterns to an array substrate to form a display panel for displaying the left and right eye images on pixels for each line;
adhering a polarizing plate on the electrostatic discharging layer of the color filter substrate in the display panel; and
adhering a patterned retarder for spatially dividing the left and right eye images displayed through the display panel on the polarizing plate.

2. The method of claim 1, wherein the light blocking pattern is formed in a stripe shape on a rear surface of the color filter substrate between vertically adjacent pixels.

3. The method of claim 2, wherein the light blocking pattern is formed of a metal having a value of 5 to 10 based on Mohs hardness selected from a group including Cr, Fe, Co, Ta, Mo, MoTi.

4. The method of claim 3, wherein the electrostatic discharging layer is selected from ITO and IZO.

5. The method of claim 3, further comprising;
cleaning the surface of the electrostatic discharging layer by an abrasive belt having an abrasive surface with $Al_2O_3$ having a hardness of about 3.

6. The method of claim 1, wherein the forming a plurality of light blocking patterns further comprises:
forming a first metal layer on the rear surface of the color filter substrate on which a color filter is formed;
forming a photoresist pattern on the first metal layer;
selectively etching the first metal layer using the photoresist pattern as a mask to form a light blocking pattern.

7. The method of claim 3, wherein the light blocking pattern is formed with a thickness of 300-1000 Å.

8. A method of fabricating a polarized glasses type stereoscopic image display device, the method comprising:
forming a plurality of light blocking patterns in a stripe shape on a rear surface of the color filter substrate on which a color filter layer is formed;
forming a plurality of electrostatic discharging patterns in a stripe shape between the light blocking patterns;
bonding the color filter substrate formed with the plurality of light blocking patterns to an array substrate to form a display panel for displaying the left and right eye images on pixels for each line;
adhering a polarizing plate on the electrostatic discharging layer of the color filter substrate in the display panel; and
adhering a patterned retarder for spatially dividing the left and right eye images displayed through the display panel on the polarizing plate.

9. The method of claim 8, wherein the forming a plurality of light blocking patterns in a stripe shape on a rear surface of the color filter substrate on which a color filter layer is formed comprises:
forming a first metal layer on a rear surface of the color filter substrate on which a color filter is formed;
forming a photoresist pattern on the first metal layer;
selectively etching the first metal layer using the photoresist pattern as a mask to form a light blocking pattern.

10. The method of claim 9, wherein the forming a plurality of electrostatic discharging patterns in a stripe shape between the light blocking patterns comprises:
forming a second metal layer made of ITO over an entire rear surface of the color filter substrate formed with the light blocking pattern in a state the photoresist pattern is remained;
selectively removing the second metal layer through a lift-off method to form an electrostatic discharging pattern in a stripe shape between the light blocking patterns.

11. The method of claim 8, wherein the light blocking pattern is formed with a thickness of 300-1000 Å.

12. The method of claim 8, wherein the light blocking pattern is formed in a stripe shape on a rear surface of the color filter substrate between vertically adjacent pixels.

13. The method of claim 8, wherein the light blocking pattern is formed of a metal having a value of 5 to 10 based on Mohs hardness selected from a group including Cr, Fe, Co, Ta, Mo, MoTi.

14. The method of claim 8, wherein the light blocking pattern and the electrostatic discharging pattern are formed with the same height.

15. A polarized glasses type stereoscopic image display device, the device comprising:
a display panel in which a color filter substrate and an array substrate are bonded together to display the left and right eye images on pixels for each line;
a plurality of light blocking patterns made of a metal having a value of 5 to 10 based on Mohs hardness, and formed in a stripe shape on a rear surface of the color filter substrate between vertically adjacent pixels;
a plurality of electrostatic discharging patterns formed between the light blocking patterns;
a polarizing plate adhered on the plurality of electrostatic discharging patterns; and
a patterned retarder adhered on the polarizing plate to spatially divide the left and right eye images displayed through the display panel.

16. The device of claim 15, wherein the light blocking pattern is formed of a metal selected from a group including Cr, Fe, Co, Ta, Mo, MoTi.

17. The device of claim 15, wherein the light blocking pattern has a thickness of 300-1000 Å.

18. The device of claim 15, wherein the light blocking pattern and the electrostatic discharging pattern have the same height.

19. The device of claim 15, wherein the plurality of rear surface ITO are connected each other electrically.

20. A polarized glasses type stereoscopic image display device, the device comprising:
a display panel in which a color filter substrate and an array substrate are bonded together to display the left and right eye images on pixels for each line;
a plurality of light blocking patterns made of a metal having a value of 5 to 10 based on Mohs hardness, and formed in a stripe shape on a rear surface of the color filter substrate between vertically adjacent pixels;
an electrostatic discharging layer selected from ITO and IZO covering the plurality of light blocking patterns and reducing a step height of the plurality of light blocking patterns;
a polarizing plate adhered on the plurality of electrostatic discharging patterns; and a patterned retarder adhered on the polarizing plate to spatially divide the left and right eye images displayed through the display panel.

\* \* \* \* \*